United States Patent [19]
McLaughlin et al.

[11] Patent Number: 5,537,382
[45] Date of Patent: Jul. 16, 1996

[54] PARTIAL RESPONSE CODING FOR A MULTI-LEVEL OPTICAL RECORDING CHANNEL

[75] Inventors: Steven W. McLaughlin, Rochester; Arthur R. Calderbank, Princeton; Rajiv Laroia, Bridgewater, all of N.J.; John M. Gerpheide, Silver Spring, Md.

[73] Assignees: Optex Corporation, Del.; AT&T Corp., N.Y.

[21] Appl. No.: 340,353

[22] Filed: Nov. 22, 1994

[51] Int. Cl.$^6$ ............................................. G11B 7/00
[52] U.S. Cl. ............................. 369/116; 369/59; 341/59; 371/37.1; 360/40
[58] Field of Search ..................... 369/94, 116, 59, 369/124; 341/59; 371/37.1, 37.8, 43; 360/40

[56] References Cited

U.S. PATENT DOCUMENTS

| | | | |
|---|---|---|---|
| 4,413,251 | 11/1983 | Adler et al. | 340/347 |
| 4,463,344 | 7/1984 | Adler et al. | 340/347 |
| 4,488,142 | 12/1984 | Franaszek | 340/347 |
| 4,566,044 | 1/1986 | Langdon, Jr. et al. | 360/40 |
| 4,691,193 | 9/1987 | Khu | 340/347 |
| 4,760,378 | 7/1988 | Iketani et al. | 340/347 |
| 4,864,536 | 9/1989 | Lindmayer | 365/119 |
| 4,870,414 | 9/1989 | Karabed et al. | 341/57 |
| 4,882,583 | 11/1989 | Dimitri et al. | 341/59 |
| 4,914,438 | 4/1990 | Kameyama | 341/59 |
| 4,928,187 | 5/1990 | Rees | 360/40 |
| 4,949,196 | 8/1990 | Davie et al. | 360/40 |
| 5,047,767 | 9/1991 | Weathers et al. | 341/59 |
| 5,099,237 | 3/1992 | Fitingof | 341/59 |
| 5,136,573 | 8/1992 | Kobayashi | 369/116 |
| 5,163,039 | 11/1992 | Lindmayer | 369/100 |
| 5,173,694 | 12/1992 | Lynch, Jr. et al. | 341/59 |
| 5,196,849 | 3/1993 | Galbraith | 341/59 |
| 5,271,016 | 12/1993 | Hilden et al. | 371/37.1 |
| 5,287,228 | 2/1994 | Sawaguchi et al. | 360/57 |
| 5,329,512 | 7/1994 | Fukimoto et al. | 369/116 |
| 5,400,313 | 3/1995 | Belser et al. | 369/116 |

OTHER PUBLICATIONS

Siegel, Paul H., "Recording Codes For Digital Magnetic Storage," *IEEE Transactions On Magnetics*, vol. 21, No. 5, pp. 1344–1349, Sep., 1985.

Kobayashi, H. et al., "Application of Partial–response Channel Coding to Magnetic Recording Systems," IBM J. Res. Develop., pp. 368–375, Jul., 1970.

Lindmayer, Dr. Joseph et al., "Electron Trapping Optical Technology—Memory's Next Generation?," *Computer Technology Review*, Summer, 1990.

Earman, Allen, "Optical Data Storage With Electron Trapping Materials Using M–ary Data Channel Coding," *Proceedings of the Optical Data Storage Conference*, Feb., 1992, San Jose, California.

Forney, G. David et al., "Coset Codes For Partial Response Channels; or, Coset Codes With Spectral Nulls," *IEEE Transactions on Information Theory*, vol. 35, No. 5, Sep., 1989, pp. 925–943.

(List continued on next page.)

*Primary Examiner*—Loha Ben
*Attorney, Agent, or Firm*—Sterne, Kessler, Goldstein & Fox

[57] ABSTRACT

A system and method for recording multi-level data to a multi-amplitude recording channel encodes binary data to form multi-level data. The multi-level data are recorded to the storage media for later recall. The system utilizes linear, multi-amplitude recording media which allows data to be stored as multi-level data—requiring fewer 'bits' to represent the same number of symbols. To obtain greater data density in the storage media, a diffraction limited write laser is utilized, resulting in a smaller write-spot size. Because the read laser is of a longer wavelength, its diffraction limited spot size is larger. As a result, more than one mark is read at a given read time resulting in a inter-symbol interference. Trellis coded modultation techniques are adopted to convert the binary input data into M-ary data having M levels. Further coding is then performed to compensate for the effects of the inter-symbol interference. This is accomplished by precoding the data using a Tomlinson-Harashima precoder. The precoding results in multi-level data (of m levels, where $m \leq \infty$).

18 Claims, 5 Drawing Sheets

OTHER PUBLICATIONS

Laroia, Rajiv et al., "A Simple and Effective Precoding Scheme for Noise Whitening on Intersymbol Interference Channels," *IEEE Transactions on Communications,* vol. 41, No. 10, Oct. 1993, pp. 1460–1463.

McLaughlin, Steven et al., "M-ary Runlength Limited Codes for High Density Optical Recording," 1994 Int'l Symposium on Information Theory, Trondheim, Norway, Jul., 1994.

McLaughlin, Steven, "Improved Distance M-ary (d,k) Codes for High Density Recording," Rochester Institute of Technology, Rochester, New York, 1994.

Ungerboeck, Gottfried, "Trellis–Coded Modulation with Redundant Signal Sets, Part I: Introduction," *IEEE Communications Magazine,* vol. 25, No. 2, pp. 12–21.

Ungerboeck, Gottfried, "Trellis–Coded Modulation with Redundant Signal Sets, Part II: State of the Art," *IEEE Communications Magazine,* vol. 25, No. 2, pp. 12–21.

Marcus, Brian et al., "Finite–State Modulation Codes for Data Storage," *IEEE Journal On Selected Areas In Communications,* vol. 10, No. 1, 1992.

Adler, Roy et al., "Algorithms for Sliding Block Codes," *IEEE Transactions in Information Theory,* vol. IT–29, No. 1, pp. 5–22, Jan., 1983.

Forney, G. David et al., "Combined Equalization and Coding Using Precoding," *IEEE Communications Magazine,* pp. 25–34, Dec. 1991.

McLaughlin, Steven et al., "Modulation Codes for Multi-amplitude Optical Recording Channels," Rochester Institute of Technology, Rochester, New York, paper presented Nov. 1994.

M. Tomlinson, "New Automatic Equalizer Employing Module Arithmetic," *Electronic Letters,* vol. 7, pp. 138–139, Mar., 1971.

G. Ungerboeck, "Channel Coding With Multi–Level/Phase Signals," *IEEE Trans. on Information Theory,* vol. IT∝28, pp. 56–67, Jan., 1982.

S. W. McLaughlin, "Improved Distance M-ary (d,k) Codes for High Density Recording," Rochester Institute of Technology, Rochester, NY, Jun., 1994.

Brita H. Olson et al., "Multidimensional Partial Response For Parallel Readout Optical Memories," *SPIE,* vol. 2297, pp. 331–337, May, 1984.

PARTIAL RESPONSE CODING FOR A MULTI-LEVEL OPTICAL RECORDING CHANNEL

BACKGROUND OF THE INVENTION

1. Field of the Invention

The present invention relates generally to data recording, and more specifically to a system and method for multi-level recording in a partial response channel.

2. Related Art

Conventional recording techniques use saturation recording to store information on the recording media. Saturation recording techniques typically store the information in a two-level (i.e., binary) form, using digital data encoding methods to mark the recording medium. The process used to encode the data is limited to codes requiring no more than two, or possibly three, symbol amplitudes. Thus, such techniques provide limits to data storage capacity and transfer rates of the medium.

The most common signal processing technique employed in saturation recording is run-length limited coding and peak detection. The application of more advanced methods of coding, such as partial response maximum likelihood (PRML) sequence detection has recently been considered for saturation recording applications. PRML techniques provide an increase in recording density and reliability over runlength limited codes and peak detection.

Significant advances in electron trapping materials have lead to the development of a storage medium that provides a linear response characteristic. Such a linear response characteristic provides an advantage over saturation-type media in that it adds an analog dimension to the storage capacity of the medium. Because the response is linear, the electron trapping material presents the ability to encode information in two dimensions—amplitude and phase. As a result, the storage medium is no longer confined to storing binary or tri-level data. Instead, the concept of M-ary, or non-binary, data coding and storage is provided. The increased symbol alphabet allowed by such encoding provides the opportunity to increase dramatically the data recording density and transfer rate of the storage device. For example, the potential storage capacity of a single 5¼ inch disk can be extended to several gigabytes if that disk were to be implemented using the electronic trapping materials.

Examples of materials that can be used as the storage media for M-ary storage are described in U.S. Pat. Nos. 4,915,982, 4,834,536, and 4,830,875. Other materials useful as the storage media are disclosed in U.S. Pat. Nos. 4,839,092 and 4,806,772, and 4,842,960. Examples of an optical disk and an optical disk drive incorporating electron trapping materials for data storage are disclosed in U.S. Pat. Nos. 5,142,493 and 5,007,037, respectively. The full disclosure of each of these Patents is incorporated by reference herein.

SUMMARY OF THE INVENTION

The present invention is directed toward a system and method for recording multilevel data to a multi-amplitude recording channel. According to the invention, binary data are encoded to form multi-level data. The multilevel data are recorded to the storage media for later recall.

One key difference between data recording as disclosed herein and conventional recording techniques is that of the storage media. Conventional storage media are saturation-type recording media, capable of storing only two-level (binary) data. To record a large number of information bits to the media requires a large number of channel symbols.

In contrast, the present invention utilizes linear, multi-amplitude recording media which allows dam to be stored as multi-level data—requiring fewer symbols to represent the same number of information bits. Preferably, this media is an optical storage media that is written to and read from using a write and a read laser, respectively.

To obtain greater data density in the storage media, a diffraction limited write laser is utilized, resulting in a smaller write-spot size. This smaller spot size yields a higher recorded data density. Because the read laser is of a longer wavelength, its diffraction limited spot size is larger. As a result, more than one mark is read at a given read time resulting in inter-symbol interference.

To take full advantage of this multi-amplitude storage media trellis coded modultation techniques are adopted. Such techniques convert the binary input data into M-ary data having M levels. Further coding is then performed to compensate for the effects of the inter-symbol interference. This is accomplished by precoding the data using a Tomlinson-Harashima precoder. The precoding results in multi-level data (of m levels, where $m \leq \infty$). The data are precoded prior to recording so that the decoding process can be implemented in a somewhat straightforward manner.

Further features and advantages of the present invention, as well as the structure and operation of various embodiments of the present invention, are described in detail below with reference to the-accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3A through 3C illustrate the effects of intersymbol interference that occurs during the read process.

DETAILED DESCRIPTION OF THE EMBODIMENTS

1. Overview and Discussion of the Invention

The present invention is directed to a system and method for multi-level encoding of data for a multiple amplitude optical recording channel.

Traditional optical recording products for data storage utilize binary (digital) encoding methods to mark the optical media. The intrinsic nature of optical marking requires the use of such encoding methods. For example, write-once recording, commonly found in compact disks, is accomplished by marking the optical material with pits or other similar features to indicate the data recorded. For example, a 1 may correspond to the presence of a pit, and a 0 to the absence of a pit. Similarly, phase-change recording is accomplished by manipulating crystalline or amorphous features of the recording material to indicate the presence of a 1 or a 0. Finally, magneto-optic recording is accomplished by altering the polarities of the magnetic material. Due to the nature of the materials, these marking techniques have limited channel encoding to binary digital code sets. Conventional magnetic recording is likewise limited to two-state encoding at very high dam densities where the feature dimensions approach the minimum domain dimensions.

As described above, the implementation of storage media using electron trapping materials allows data to be stored at multiple levels. Thus, the use of a M-ary, or non-binary code set would enable the recording system to take full advantage of the properties of the electron trapping material. This results in significant increases in both data density and transfer rate. The full potential of optical recording media based on materials which exhibit the electron-trapping phenomenon and provide a very broad linear amplitude response can be realized by implementing M-ary data code sets.

2. The Multi-Amplitude Optical Channel

2.1 Multi-Level Recording Media

An example of a multi-amplitude optical storage media is now described. Electron trapping is an opto-electronic approach to optical recording. To prepare the electron-trapping media, a disk, or other storage substrate, is coded with a II–VI phosphor material that is doped with two rare earth metals. The fundamental process responsible for the storage of information in the electron-trapping material is the transfer of an electron charge from one dopant atom to a neighboring different dopant atom under the stimulus of incident light radiation. Thus, to facilitate the operation of writing to the material, the material is illuminated with light at a first wavelength so that electrons from one dopant atom are accelerated to a higher energy state in a second dopant atom, where they remain trapped at energy levels determined by the dopant materials.

To read the information, the material is illuminated with light of a second wavelength. The absorption of a photon at this second wavelength provides the trapped electron with enough energy to elevate it out of the trap, and return it to the ground state of the first dopant atom, thereby releasing the stored energy in the form of visible light.

Although this is a two-state process, the effective "domain" is delimited by the adjacent dopant pair within the crystal lattice. Because the effective domain is very small as compared to the marking resolution (defined by the spot size of the light radiation), a marking region contains many effective domains. The high ratio of mark-to-domain dimension provides a linear amplitude response in a similar manner to analog audio-video magnetic recording. That is, the number of emitted photons is proportional to excitation energy, and hence, is linear in this sense.

The above description provides one example of how an electron-trapping material can be implemented to provide multi-level recording media. This description is provided by way of example only, and it is not intended to limit the scope of the invention in any way. It will become apparent to a person skilled in the relevant art how to implement the invention using other types of multi-amplitude recording media.

2.2 A Multi-Level Recording Channel

Figure 1:
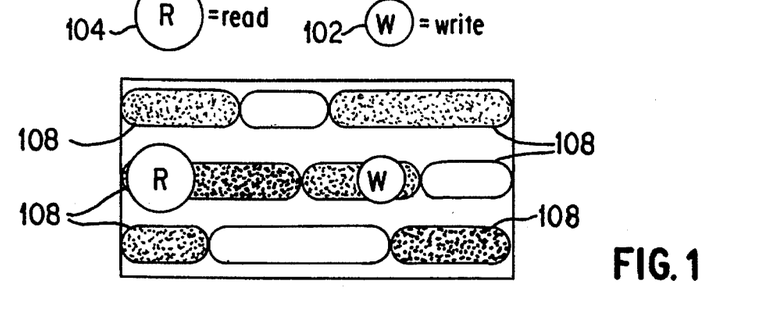
FIG. 1 is a diagram illustrating a portion of a track written with "marks" having different intensity and length.

A model of an M-ary channel according to the invention is now described. FIG. 1 is a diagram illustrating a portion of a track written with "marks" having different intensity and length. The channel is written and read optically by separate lasers focused to 'spots' on the media. A write spot 102 of diameter $L_W$ and a read spot 104 of diameter $L_R$ result from the focusing of a write laser and a read laser onto the media. Because of the gaussian properties of the coherent laser beams, the spots are generally circular. However, because the disk is spinning during read and write operations, the remnant spots 108 take the oblong shape that is illustrated in FIG. 1.

For writing multiple levels of data, the write laser is positioned above a track on a rotating disk and its intensity is modulated. The strength of the remnant mark on the disk is proportional to the write laser intensity. Specifically, the trapping level, or number of electrons trapped, is proportional to the intensity of light impinging on the media. Thus, multiple levels of encoding are provided by modulating the intensity of the write laser.

For reading, the read laser is positioned above the track to be read and a constant intensity illumination is provided to the written-to media. As a result of the excitation provided by the read laser, trapped electrons are released from the trapped state resulting in the emission of photons. The intensity of the emission is proportional to the number of electrons that were trapped during the write process. This allows the multiple levels to be detected at the read stage.

According to a preferred embodiment of the invention, the wavelength of the read laser, $\lambda_R$, is different from the wavelength, $\lambda_W$, of the write laser. Specifically, in one embodiment, the data are written with a blue light laser having a $\lambda_W$ of 488 nanometers (nm) and they are read with a red laser having a $\lambda_R$ of 647 nm.

2.3 A Multi-Level Channel Model

Figure 2:
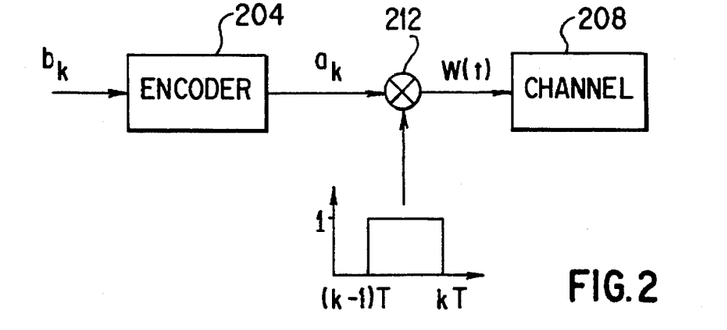
FIG. 2 is a block diagram illustrating a systems-level channel model for the M-ary recording channel.

FIG. 2 is a block diagram illustrating a systems-level channel model for the M-ary recording channel. This model includes an encoder 204, an optical channel 208 and a multiplier 212. In this model, $b_k$ denotes a user bit sequence (i.e., the data to be recorded). Typically, the user data to be recorded as provided by the user are in digital (binary) form. To take full advantage of the multi-level properties of the storage medium, these digital data are encoded by encoder 204 to provide multi-level data. To this end, encoder 204 receives the user bit sequence $b_k$ and codes this sequence to produce a coded channel symbol sequence $a_k$. The coded channel symbol sequence is the actual multi-level coded data that are to be recorded onto the multi-level recording channel.

To record the sequence $a_k$, the sequence is used to modulate the write laser as represented by multiplier 212. Variations in the amplitude of $a_k$ result in a variation in the intensity of the modulated write-laser signal w(t). Because sequence $a_k$ is a sequence having m levels (theoretically $m \leq \infty$), the write laser is modulated to m levels. Therefore, m levels of data are written to the medium.

In the model illustrated in FIG. 2, w(t) represents the modulated laser light, or, in reality, the mark pattern written on the disk where $$w(t) = \sum_{i=1}^{n} a_i b(t - iT_s) \quad (1)$$

In equation (1), $b(t-kT_s)$ is a "box" function representing one pulse of the unmodulated write laser and having a nominal height of one (1), a duration time of $T_S$ and $n<\infty$. Although there is flexibility in choosing a value for $T_S$, in one embodiment, $T_S$ is chosen to be substantially close to or equal to $T_W = L_W/v$, where $L_w$ is the spotsize of the write laser and v is the velocity of the medium. In an alternative embodiment, at least one class of modulation codes, however, uses $T_S<T_W$ (M-ary runlength limited codes are considered later).

During the read process, information is read from the media using a read laser with spotsize $L_R$. The read laser illuminates the recorded marks and the media releases a number of photons. The number released is proportional to the mark intensity as originally determined by the intensity of the write laser (i.e., as modulated by $a_k$). The photons are counted using a photodetector whose output is an analog voltage r(t). An approximation to r(t) is a sliding, ideal integrator, namely $$r(t) = K \left[ \int_{t-T_R}^{t} w(r)dr + n(t) \right] \quad (2)$$

where the duration of the impulse is $T_R = L_R/v$. K is a proportionality constant and n(t) is a white gaussian noise. Without loss of generality it can be assumed that K=1. A decoder (not illustrated in FIG. 2) uses r(t) to estimate the code sequence $a_k$.

The purpose of encoder 204 is to convert a sequence of user data bits to a channel waveform. Specifically, encoder 204 converts the user binary data to multi-level data. The performance of the code is measured by its storage density D (in bits/unit area) and error probability $P_e$ (bit error rate, or BER).

The bit density D in user-bits/area is computed as D=b/vTW, where b is the number of bits stored during period T on a disk rotating at speed v with a track width W. Assuming a normalized product vW=1, and for convenience let $T=T_R$, the linear density D (often called density ratio) becomes (in bits/sec). $D=b/R_R$, (3)

Given this model, the ideal coded modulation scheme is one that densely stores user data with high reliability.

2.4 Induced Intersymbol Interference

According to one embodiment of the invention, the read and write lasers are diffraction limited. As a result, the read and write spot diameters, $L_R$ and $L_W$ as focused on the medium are made as small as possible. This has the effect of maximizing storage density on the disk. The diffraction limits $L_{W,diff}$ and $L_{R,diff}$ are lower bounds on the spot sizes $L_W$ and $L_R$, respectively. Because the diffraction limit is proportional to the laser wavelength, $\lambda$, and because the lasers are diffraction limited, the read spot size $L_R$ is larger than the write spot size $L_W$. In fact, in the specific embodiment described above using a blue write laser and a red read laser, $L_R$ is approximately 1⅓ times the size of $L_W$. The manner in which this spot size differential is used to induce a controlled intersymbol interference (i.e. partial response) channel is now described.

As described above, both the read and the write laser are diffraction limited. The minimum mark $T_{min}$ is constrained by the spot size of the write laser $L_W$ and speed of the disk, namely $T_{min}=T_W$. The maximum mark $T_{max}$ is constrained by system timing requirements. Because many recording systems derive timing from transitions in the recorded signal level, periodic transitions in recorded amplitude are required, thus constraining the maximum width $T_{max}$ of a mark.

Due to the diffraction limiting, in the above-described embodiment having a blue write and a red read laser, read spot 104 is actually approximately 1⅓ times the size of write spot 102. One reason for diffraction limiting the write laser is to increase the density at which marks, and thus dam, are written to the medium. Because spot size $L_W$ is constrained to the minimum beam waist size, the data density is maximized for a given write laser wavelength, $\lambda_W$.

Figure 3A:
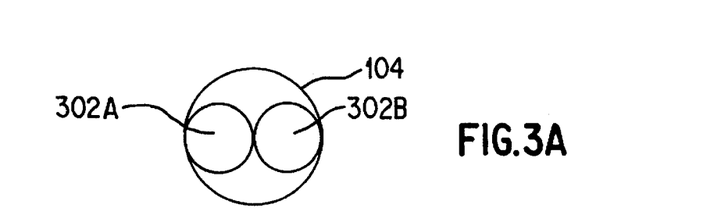
Figure 3B:
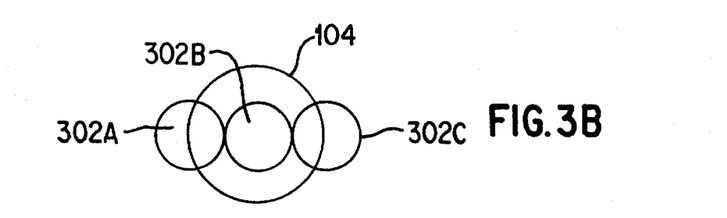

This advantage of a minimum $L_W$, however, is somewhat offset by a resultant intersymbol interference that occurs during the read process. To elaborate, because $L_R$ is larger than $L_W$, when data are read, more than one symbol are read at a time. For example, assume that $L_R$ is twice the diameter of $L_W$. In this example, the read laser actually stimulates emission from the spatial equivalent of two marks. This is illustrated in FIGS. 3A and 3B. In FIG. 3A, read laser actually reads the levels stored in marks 302A and 302B. In FIG. 3B, read laser reads the levels stored in marks 302A, 302B, and 302C. Because the detector cannot distinguish which of the received photons are from which mark, the detector provides a signal level that is the total of all photons detected. Thus, this intersymbol interference can result in an erroneous reading.

Figure 3C:
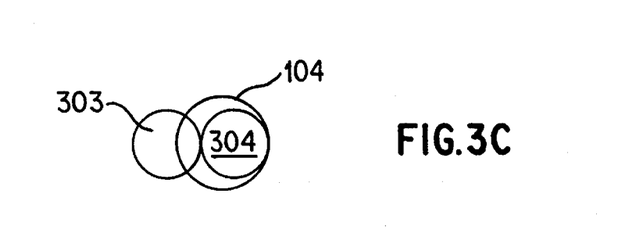

As another example, consider the embodiment described above where $L_R$ is 1⅓ times the size of $L_W$. In this example, illustrated in FIG. 3C, the read laser results in the detection of the current mark 304 (the mark we want to detect) plus one third of the previous mark 303. This is illustrated in FIG. 3C.

To minimize the effects of the resultant intersymbol interference, two solutions can be implemented. A first solution attempts to decode the results of the read operation to remove the effects of the intersymbol interference. Such a solution requires a decoder that estimates the effect of the extra ⅓ of the mark that is read and subtracts this amount from the detected value to produce a decoded signal.

A second solution is to provide an additional encoding phase in encoder 204 to subtract the effect of the additional ⅓ of the mark before the data are written to the medium. It is this second solution that is the preferred embodiment of the invention.

Note that for the example embodiment described herein, there is intersymbol interference because the read laser spot size is approximately 1⅓ that of the write laser. The present invention is described in terms of this example embodiment. Description in these terms is provided for convenience only. It is not intended that the invention be limited to application in this example embodiment, where $L_R=1⅓L_W$. In fact, after reading the following description, it will become apparent to a person skilled in the relevant art how to implement the invention with alternative partial responses.

3. Encoder

As stated above, encoder 204 is implemented to encode the binary input data into multi-level data that makes optimum usage of the multi-level recording channel 208. Additionally, in the preferred embodiment where intersymbol interference results from diffraction limited read and write lasers at two different wavelengths, encoder 204 provides an additional encoding stage to precode the data. This precoding is implemented to counteract the effects of the intersymbol interference before the data are written to the recording channel. Because the data are precoded before being recorded, the decoding process is simplified. Note that in this embodiment, as will become apparent to a person skilled in the relevant art after reading the below disclosure of the precoder 408, the actual data recorded onto the recording channel can theoretically have an infinite number of levels.

Figure 4:
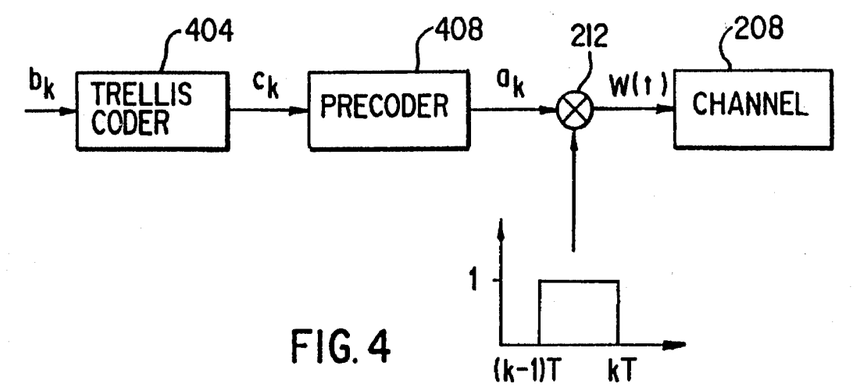
FIG. 4 is a block diagram illustrating the system model of FIG. 2, with encoder 204 divided into the two phases to implement the preferred embodiment.

FIG. 4 is a block diagram illustrating the system model of FIG. 2, with encoder 204 divided into the two phases to implement the preferred embodiment. In the embodiment illustrated in FIG. 4, these phases are a trellis coder 404 and a Tomlinson-Harashima precoder 408.

Trellis coder 404 receives the binary input dam, $b_k$, and encodes this input data to generate an M-ary output signal $C_k$ (having M levels). Tomlinson-Harashima precoder 408 accepts the M-ary data $c_k$ and codes this data to anticipate the effects of the inter-symbol interference. This results in precoded multi-level data $a_k$. It is this precoded multi-level data $a_k$ that modulates the write laser to record the precoded multi-level data onto optical channel 208. Trellis coder 404 and Tomlinson-Harashima precoder 408 are now described.

3.1 Trellis Modulation Coder

Figure 5A:
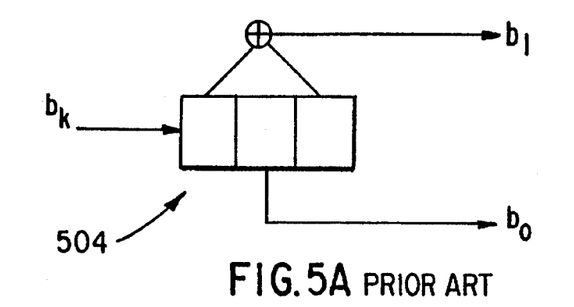
FIG. 5A is a block diagram illustrating a finite state machine used to implement a simple rate one-half binary convolutional code.
Figure 5B:
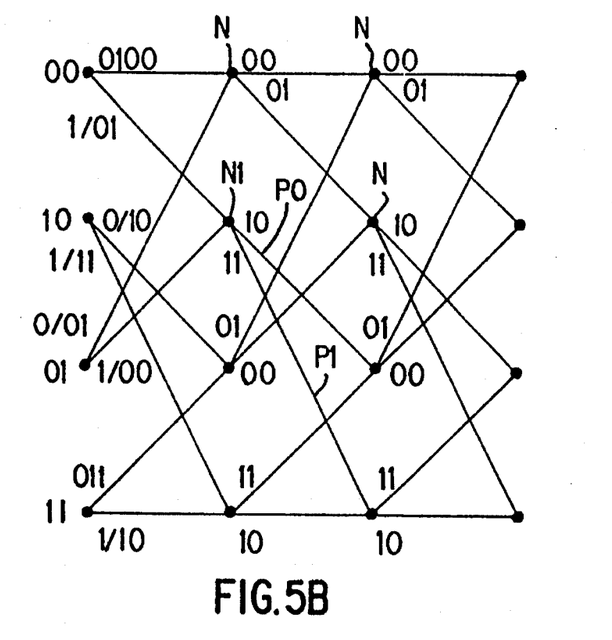
FIG. 5B is a trellis illustrating the output bits that result for a stream of input bits for the specific coder illustrated in FIG. 5A.

Convolutional coding has long been used in the digital communications field to improve the bit error rate (BER) of transmitted data. A block diagram illustrating a finite state machine used to implement a simple rate one-half binary convolutional code is illustrated in FIG. 5A. According to this example, for each data bit entering shift registers 504, two channel bits, $b_0$ and $b_1$, are produced. The trellis of FIG. 5B illustrates the output bits that result for a stream of input bits for the specific coder illustrated in FIG. 5A.

For each node N in the trellis, an input data bit results in a specific set of output bits. For example, given a position at node N1, an input bit of 0 results in an output of (1,0), as illustrated by path P0; an input bit of 1 results in output bits of (1,1), as illustrated by path P1.

As can be seen by the above description, traditional convolutional coding results in output bits ($b_0$, $b_1$ in binary form. To provide M-ary data, this basic concept of binary convolutional coding has been enhanced. The enhanced scheme is referred to as trellis-coded modulation.

A common example of a trellis-coded modulation code is provided by the Ungerboeck-style codes often used in high-speed modems (9.6–33.6 kbaud). The basic idea behind Ungerboeck-style codes for modem applications is to have a rather large number of levels (a large M), but to severely limit the sequences produced by the encoder. In most instances, the minimum distance ($d^2_{free}$) between sequences is actually increased rather than decreased using these codes.

Figure 6A:
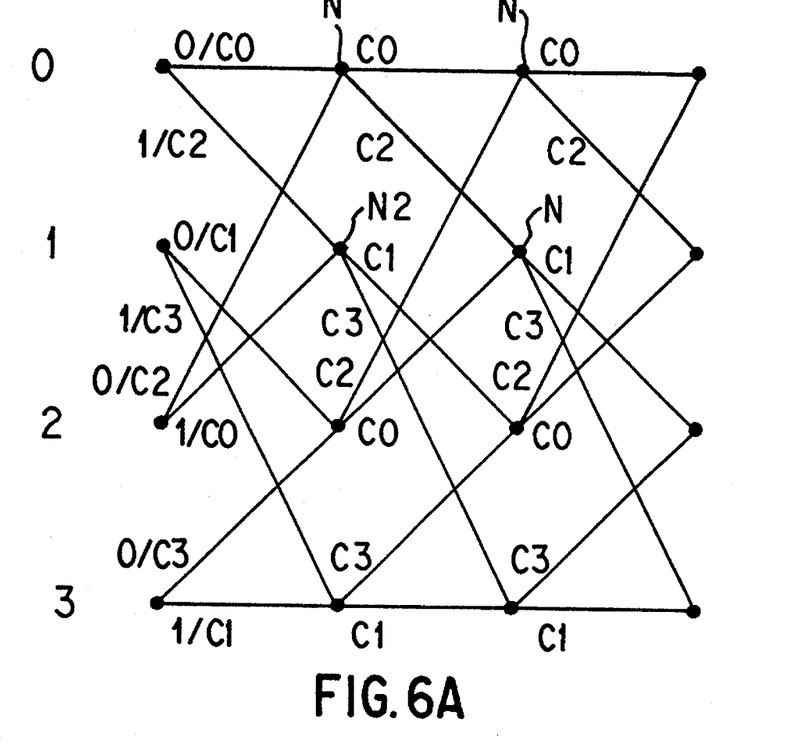
FIG. 6A depicts the trellis of FIG. 5B when the four output sequences 00, 10, 01, and 11 are replaced with four signal sets $C_0$ through $C_3$.
Figure 6B:
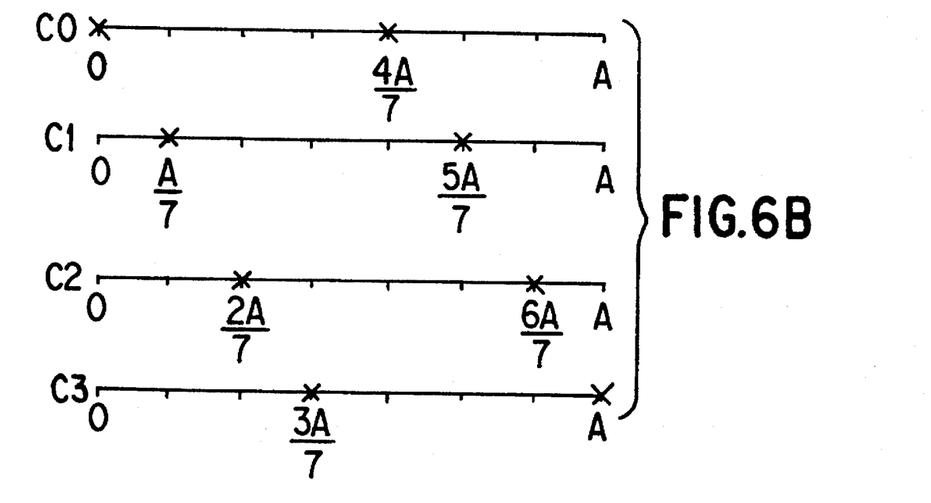
FIG. 6B depicts an example of partitioning of signal sets $C_0$ through $C_3$.

In operation, the trellis-modulation coder replaces the binary output bits of the convolution coder with a signal set. In one example illustrated in Table 1, the four output sequences 00, 10, 01, and 11, are replaced with four signal sets $C_0$ through $C_3$. The resulting equivalent trellis is illustrated in FIG. 6A. An example of partitioning of signal sets $C_0$ through $C_3$ is illustrated in FIG. 6B. For an eight-level code (M=8), each signal set is a set of two values between '0' and the saturation level of the medium, 'A'. For example, signal set $C_0$ includes the values '0' and 4A/7.

TABLE 1

| | |
|---|---|
| 00 | signal set C0 |
| 01 | signal set C1 |
| 10 | signal set C2 |
| 11 | signal set C3 |

The combined total of signal sets $C_0$ through $C_3$ contains eight (8) discrete values between zero (0) and the saturation level. Thus, the trellis-coded modulator in this example produces an M-ary data stream where M=8.

From a given node N in signal set equivalent trellis 600, the next input bit of the input stream $b_K$ determines the path taken and the specific value chosen from the signal set of that path. This determination is made using the output bits that result from the convolutional coder finite state machine. For example, consider what happens when an input bit is received and the current state of the coder is at node N2. As with the binary trellis, an input bit of '0' results in output bits $b_0$, $b_1$ having the values '1' and '0', respectively. However, unlike the binary trellis, the input bit does not select the path directly. Instead, one of the output bits (e.g., $b_0$) directly selects the path to follow (i.e., the signal set to choose), and the second of the two bits (e.g., $b_1$) selects which level in the signal set is to be chosen as the output level. Following the same example, for output bits $b_0$, $b_1$ of '1', '0', $b_0$='1' is used to select signal set $C_1$, and $b_1$='0' is used to select the value 5A/7 as the output level of the coder. Note that 5A/7 is the sixth of eight levels.

Techniques for trellis-coded modulation similar to that described here are well-known in the modem communications industry. These Ungerboeck-style codes can produce a coded sequence having a constant amplitude over a considerable number of symbols. However, in one embodiment of the optical recording channel, timing is derived from symbol amplitude transitions. As a result, a string of constant amplitude symbols can result in a loss of timing synchronization. To overcome this difficulty, a time-varying trellis is implemented.

Figure 7:
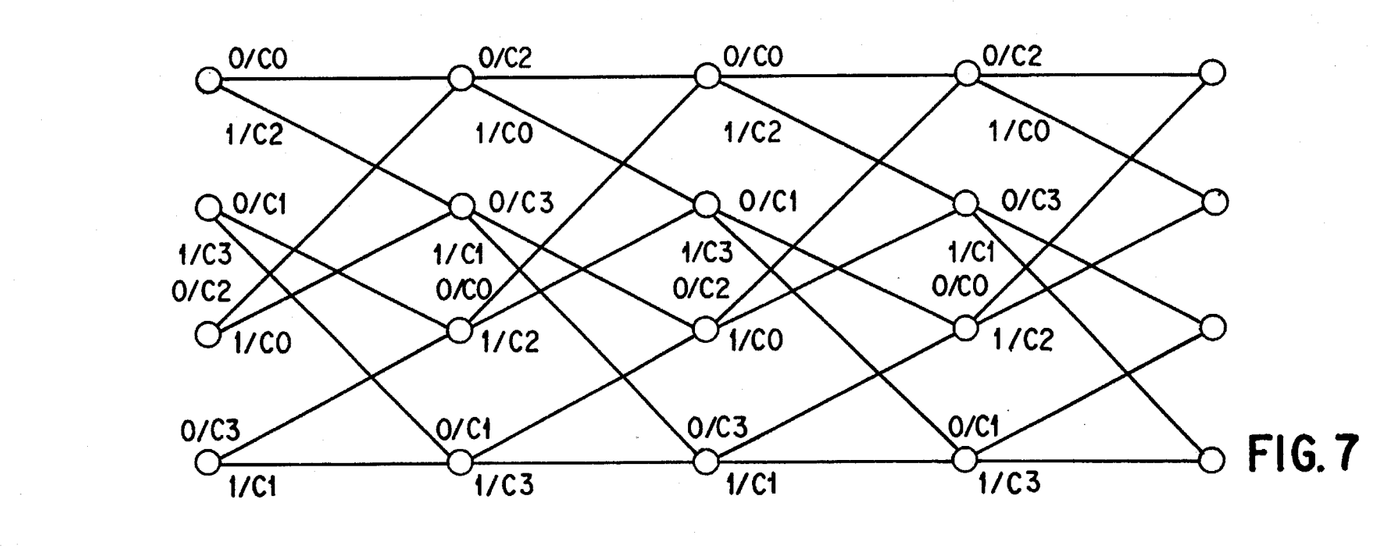
FIG. 7 illustrates an example of a time varying trellis.

An example of a time varying trellis is illustrated in FIG. 7. As with the trellis presented in FIG. 6, C0, C1, C2 and C3 are the signal sets obtained by standard Ungerboeck partitioning. However in the time varying trellis 700, the even stages of the four-state trellis are reassigned. For example, in every other stage, C0 is replaced with C2. As a result of this reassignment, the maximum runlength of any signal subset (and hence code symbol) is limited to three. A similar type of reassignment can be made for an eight-state trellis to obtain a code that has a maximum symbol runlength of four. A further advantage of a time-varying trellis is that it suffers no loss in rate and no loss in minimum distance.

3.2 Tomlinson-Harashima Precoder

Figure 8:
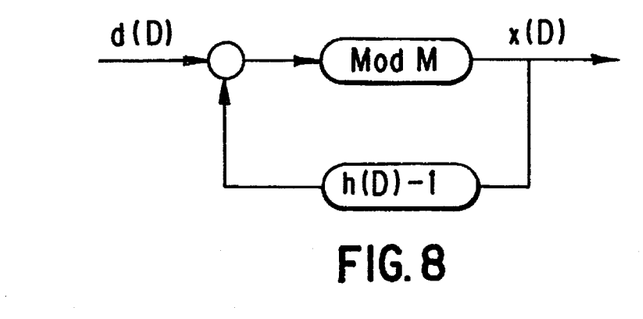
FIG. 8 is a block diagram illustrating one embodiment of a Tomlinson-Harashima precoder.

As stated above, the differential between read and write spot sizes $L_r$ and $L_W$ is used to force inter-symbol interference to increase recording density. The Tomlinson-Harashima precoder 408 is implemented to precode the modulated data to compensate for this inter-symbol interference prior to the data even being written to the optical recording channel 208. Although Tomlinson-Harashima precoding is generally known in the communications industry, it is a new and novel feature of the invention to provide a partial response optical recording channel 208 induced by inter-symbol interference and to precompensate for this interference prior to recording using a Tomlinson-Harashima precoder 408. In summary, by anticipating the inter-symbol interference in the channel 208, the data are precoded so that the channel 208 "undoes" this precoding. This leaves the output (i.e., the data read from the channel 208) easily decodable using simple techniques such as maximum likelihood Viterbi decoding.

To determine the type of precoding that needs to be performed, it is first necessary to define the channel 208. Generally, for the optical recording channel 208 described herein, the channel 208 can be defined as a $1+\alpha D$ channel, where $\alpha$ is a function of the read and write spot sizes. In its simplest form, $\alpha$ can be described as the ratio of the write spot size to the read spot size. In the example provided above, where $L_R-1\frac{1}{3} L_W$, channel 208 is described as a $1+D/3$ channel.

Because of the decreased spot size of write spot $L_W$, a signaling density increase of $1\frac{1}{3}$ is realized. As a result, coding at 3 bits/$T_W$ results in 4 bits/$T_R$.

FIG. 8 is a block diagram illustrating one embodiment of a Tomlinson-Harashima precoder 408. The Tomlinson-Harashima precoder anticipates the amount of inter-symbol interference and precodes the data to counteract the effects of this interference before the data are written to the recording channel 208. For a $1+\alpha D$ channel, we know that the inter-symbol interference results in the data read from the medium being the actual data plus $\alpha$-times the previous data. Thus, Tomlinson-Harashima precoder 408 anticipates the a effect.

For example, in the $1+D/3$ example described herein, $L_R-1\frac{1}{3} L_W$. For this channel, the inter-symbol interference results in read data that is equal to the actual mark being read plus $\frac{1}{3}$ of the previous mark. To counteract this inter-symbol interference, Tomlinson-Harashima precoder 408 is implemented to subtract $\frac{1}{3}$ of the previous symbol from the value of the present symbol before the present symbol is written to the recording channel 208. In this example, the Tomlinson-Harashima precoder can be described as $$a_k = \left[ c_k - \sum_{j \geq 1} h_j a_{k-j} \right] \bmod M \quad (4)$$

For the specific example of the $1+D/3$ channel, the output of Tomlinson-Harashima precoder 408 is given by $$a_k = \left[ c_k - \frac{1}{3} a_{k-j} \right] \bmod M \quad (5)$$

As can be seen by Equation (5), Tomlinson-Harashima precoder 408 outputs a value that is equal to the current input value minus $\frac{1}{3}$ of the previous input value. This counteracts the effect of inter-symbol interference of a recording channel where $L_R=1\frac{1}{3} L_W$. Table 2 illustrates precoder output $a_k$, given the input symbols $c_k$. As can be seen by examining the first two rows of Table 2, the precoder output $a_k=c_k-\frac{1}{3}a_{k-1}$. It is precoder output $a_k$ that is written to the recording channel.

TABLE 2

| symbols | $c_k$ | 1 | 2 | 2 | 3 | 1 | 0 | 0 | 1 | 0 | 3 | 2 | 1 |
|---|---|---|---|---|---|---|---|---|---|---|---|---|---|
| precoder output | $a_k$ | 1 | 1.67 | 1.44 | 2.51 | .16 | 3.95 | 2.68 | 0.10 | 3.96 | 1.68 | 1.44 | .519 |
| channel output | $y_k$ | 1 | 2 | 2 | 3 | 1 | 4 | 4 | 1 | 4 | 3 | 2 | 1 |
| decoded output | $\underline{c_k}$ | 1 | 2 | 2 | 3 | 1 | 0 | 0 | 1 | 0 | 3 | 2 | 1 |

Because of the inter-symbol interference discussed above, the output of recording channel, $y_k$, is not identical to what was actually recorded onto the recording channel. In reality, $Y_k=a_k+\frac{1}{3}a_{k-1}$. But, because $a_k=c_k-\frac{1}{3}a_{k-1}$, for the recorded data as given above, $Y_k$ is equal to $c_k$ except in certain conditions. An example of such a condition is in row 4, columns 7, 8 and 10 of table 2, where the value for $y_k$ is determined to be four (4). This is clearly an anomaly and is treated by the decoder which provides an output $c_k$ of zero (0) in this case.

Thus, for the $1+D/3$ channel, in the example given, row 3 of Table 2 illustrates the data that are actually read from the recording channel. Decoding this output using simple decoder techniques yields $c_k$, which is identical to the M-ary symbol stream $c_k$ originally provided to Tomlinson-Harashima precoder 408.

4. Modulation Codes

At least two classes of codes can be considered for the multi-amplitude recording channel: partial response codes and M-ary (d,k) codes. The performance of these codes is evaluated based on their density, D, (in bits/unit area) and minimum distance. The coding density is first discussed here; the minimum distance parameters are discussed in the code comparison section of this document.

4.1 M-ary Runlength Limited Codes

This section describes the modulation and coding strategy employed in a system using the electron trapping material for the recording channel. As is common in binary saturation recording, in linear recording the read and write lasers can be chosen to have the same spot size. In this case, because the write laser is in the blue range and the read laser is in the red range, $L_{W,diff}<L_{R,diff}$. Therefore, the write spot is expanded such that $L_W=L_{R,diff}$ which implies that $T_W=T_R=T_{min}$. In one embodiment, the symbol interval is chosen as $T_S=T_R$ and signalling is performed accordingly. In an alternative embodiment, the symbol interval is chosen as $T_S<T_R$. This alternative embodiment is now described. This signaling strategy is commonly used in runlength coding for saturation recording channels.

The principal idea in this embodiment, is to increase the rate at which symbols are stored on the disk, and to use a code that ensures minimum and maximum mark width constraints are satisfied. Symbols are written every $T_S<T_{min}$, each conveying R bits/symbol and satisfying the minimum and maximum mark width constraints. Signaling faster on the disk improves the symbol density on the disk, but imposing constraints on the symbol sequences reduces the possible encoding rate R.

The manner in which $T_{min}$ and $T_{max}$ channel constraints are satisfied is now described. The symbol interval $T_S$ is defined such that $T_{min}=(d+1)T_S$ for some finite integer d, and $T_{max}=(k+1)T_S$ for some finite integer k. To satisfy the $T_{min}$ and $T_{max}$ constraints, encoder 204 must produce a run of at least d+1 and at most k+1 coded symbols of constant amplitude.

Following the above modulation strategy, an M-ary runlength limited (RLL) or (d,k) code is defined as one that produces at least d and at most k 0's (zeros) between consecutive nonzero symbols. Using these codes with a mod-M NRZI-style precoder, the $T_{min}$ and $T_{max}$ constraints are satisfied.

An M-ary runlength limited code is one that transforms the user bit sequence to a channel symbol sequence $\alpha_i$ satisfying channel runlength constraints $T_{min}$ and $T_{max}$. Symbols from sequence $\alpha_i$ are from a finite alphabet B of size M, namely, $\alpha_i \in B = \{b_0, b_1, \ldots, b_{M-1}\}$, where $b_i \in [0, A]$ and where A is the saturated input level.

The density D in bits/$T_R$ is computed as follows. Since the code produces (d+1) symbols/$T_{min}$, each conveying R bits/symbol, and since $T_{min} = T_R$ it follows that the density is $$D = \frac{(1+d)R}{T_R} \quad (6)$$

Run-length limited codes designed for a saturation recording (i.e. M=2) channel generally achieve densities on the order of $<=1.5$ bits/$T_{min}$ for small values of d. Codes for larger values of M designed using the known Adler, Coppersmith and Hassner (ACH) state splitting algorithm achieve densities above 2 bits/$T_R$.

Generally speaking, the chief advantage of the M-ary (d, k) codes is the low complexity of the encoder (finite state machine) and decoder (sliding block lookup table), although examples of large complexity decoders are not hard to construct. While some M-ary (d,k) codes have good minimum distance, many have distance equal to the minimum spacing between adjacent symbols in B.

For purposes of comparison, consider codes with densities D=3.0 and D=4.0, respectively. The D=4 code is a 15-state finite state machine encoder and state-independent sliding block decoder satisfying M=10, d=3 and k=10 constraints. The D=3 code is a 6-state finite state machine encoder and state-independent sliding block decoder satisfying M=6,d=2,k=7 constraints.

4.2 Partial Response Channel

A partial response channel is provided where inter-symbol interference occurs. For the appropriate choices of $T_S$, $T_W$ and $T_R$, a partial response channel is induced. First let $T_S = T_W$. For the optical system described above using a red read laser and a blue write laser, the read spot $L_R$ is greater than the write spot $L_W$. This implies $T_R \geq T_W$. Let $T_R = (m+\rho)T_W$ where m and $\rho$ are the integer and remainder portions of the quotient $T_R/T_W$, respectively.

Using equation (2), since $T_S = T_W$ and sampling r(t) every $kT_W$ it follows that (assuming n(t)=0)

$$\begin{aligned} r(kT_w) &= \int_{(k-m-\rho)T_w}^{kT_w} w(\tau)d\tau \quad (7)\\ &= \int_{(k-m-\rho)T_w}^{kT_w} \sum_{i=1}^{n} a_i b(\tau - iT_w) \\ &= \int_{(k-m)T_w}^{(k-m)T_w} \sum_{i=1}^{n} a_i b(\tau - iT_w) + \\ &\quad \int_{(k-m-\rho)T_w}^{(k-m)T_w} \sum_{i=1}^{n} a_i b(\tau - iT_w) \\ &= \sum_{i=k-m+1}^{k} a_i \int_{(i-1)T_w} b(\tau - iT_w)d\tau + \rho a_{k-mT_w} \\ &= T_w \left( \sum_{i=k-m+1}^{k} a_i + \rho a_{k-m} \right) \end{aligned}$$

Without loss of generality we set $T_W = 1$ and the sampled channel output is $$\tau_k = \alpha_k + \ldots + \alpha_{k-m+1} + \rho \alpha_{k-m} \quad (8)$$

or equivalently $$\begin{aligned} \tau(D) &= a(D) + \ldots + D^{m-1}a(D) + \rho D^m a(D) \quad (9)\\ &= a(D)(1 + D + \ldots + D^{m-1} + \rho D^m) \end{aligned}$$

Thus, the input/output relation of the write/read/sampled channel is an order m partial response polynomial.

For the optical system described above, in one embodiment, the read laser is a red laser ($\lambda_R$=647 nm) and the write laser is a blue laser ($\lambda_W$= 488 nm). Assuming both read and write lasers are focused to their diffraction limits $L_W = L_{W,diff}$, $L_\tau = L_{\tau,diff}$, $$\frac{T_R}{T_W} = \frac{\lambda_R}{\lambda_W} = \frac{647}{488} = 1.33 \quad (10)$$

which implies that m=1 and $\rho=\frac{1}{3}$, yieldin $$\left(1 + \frac{D}{3}\right)$$

partial response channel. In the next section we consider coding for the partial response channel. The codes considered below are described in terms of the 1+D/3 channel. After reading this disclosure, it will become apparent to a person skilled in the art how to implement codes for 1+$\alpha$D channels for other values of $\alpha$.

4.3 Codes for the Partial Respons $$1 + \frac{D}{3}$$

Channel

Codes for partial response channels are discussed in this section. In one embodiment, the data are precoded using a Tomlinson-Harashima precoder 408, as described above, where an input is a code sequence $c_k$ and output is the amplitude sequence $a_k$. Assuming a noiseless channel, it is easy to show the coded sequence $c_k$ is equal to the sampled output $y_k$ mod M. For the system to have good error performance, it is desired that the coded sequence $c_k$ have some error protection ability.

Because the optical recording channel can be modeled as an additive white gaussian noise (AWGN) channel, the coded symbol sequence $c_k$ should also have good distance. As stated above, in one embodiment Ungerboeck-style trellis codes are implemented for the encoding. Ungerboeck codes are fully described in *Channel Coding with Multi-level/Phase Signals*, by Ungerboeck, G., published in IEEE Trans. on Information Theory, vol. IT-28, pp. 56–67, January 1982. A rate R (in units of user bits/coded-symbol) trellis code transforms user bits into coded symbols using partitioned signal sets and convolutional codes.

As stated above, in one embodiment a modification is made to the amplitude modulation trellis codes to ensure that the maximum symbol runlength constraint is satisfied. Because timing is derived from transitions in amplitude, a time-varying trellis (e.g. trellis 700) ensures a maximum symbol runlength is satisfied.

The storage density of such a code can be easily computed. Assuming the trellis code operates at R bits/symbol, and since we write symbols 1⅓ times faster than we read (i.e. $T_R = 1\frac{1}{3}T_W$)$_1$ the density is D=1⅓R. For purposes of comparison we consider codes with rate R=2.5 and R=3 that active densities D=3⅓ and D=4.0, respectively.

5. Specific Partial Response Codes

Three novel partial response codes to drive the tomlinson-harashima precoder 408 are now described. The first code is a partial response code having a density D=3.33 and the second and third codes are partial response codes having a density D=4.0.

The codes described are multi-amplitude, trellis-based codes that exploit the fact that for one embodiment of the multi-level optical recording channel 208 as described above, the wavelengths of the read and write lasers are different and the lasers are diffraction limited. In one particular embodiment, a write laser is provided at 488 nm and a read laser at 647 nm. With diffraction limiting, spots may be written that are ¾ the size of the spot otherwise written. This results in a disk with 1.333 times larger symbol density than normal. As described above, this results in inter-symbol interference that the precoder is designed to remove.

As stated above, a time varying trellis can be implemented to ensure that a maximum symbol runlength is obtained. Table 4 illustrates an implementation of the time-varying trellis illustrated in FIG. 7. Although the specific values assigned for the states can be made somewhat arbitrary, the assignment indicated in Table 3 is optimum as it provides a minimum number of terms. The assignment of signal sets C0–C3 is truly arbitrary as there is no optimum assignment. Thus, the assignment used is that illustrated in Table 1.

TABLE 3

| A0=000, | A1=110, | A2=101, | A3=011, |
|---|---|---|---|
| B0=100, | B1=001, | B2=010, | B3=111 |

TABLE 4

| Data bit $H1_k$ State $S_k$ | 0 Signal Set/Next State | 1 Signal Set/Next State |
|---|---|---|
| 000 | 00/100 | 10/001 |
| 001 | 11/101 | 01/011 |
| 010 | 00/000 | 10/110 |
| 011 | 11/010 | 01/111 |
| 100 | 10/000 | 00/110 |
| 101 | 10/100 | 00/001 |
| 110 | 01/010 | 11/111 |
| 111 | 01/101 | 11/011 |

5.1 Density 3.33 Partial Response Code

This code uses a convolutional encoder 404 having a time varying, two-dimensional trellis code (illustrated in FIG. 7). The encoder 404 takes p=5 input bits and converts this to q=2 channel symbols. One of the five input bits (e.g., $h_1$) is used to drive convolutional coder 404. This bit selects the path followed along the trellis from a current node (i.e., selects the signal set $C_K$). The remaining four bits (e.g., h2–h5) select a point from the signal set $C_K$ in Table 5 corresponding to the path selected by the first bit. Because four bits are used, each signal set can contain 16 points, or values. With four signal sets, there are a total of 64 points, or values, thus producing an M-ary code out of encoder 404 where M=8.

This coding scheme results in a bit encoding rate of 2.5 bits per channel symbol. Because symbols are written 1.333 times more frequently, the net density is D=3.33 (i.e., 2.5×1.333).

A state table for this code is illustrated in Table 5. The channel symbols are chosen from 4 signal sets, each signal set having 16 levels. In each case, two symbols, c1, c2 are chosen based on the signal set $C_K$ chosen and based on the four remaining data bits (e.g., h5, h4, h3, h2).

TABLE 5

| | Signal Set $C_K$ | | | |
|---|---|---|---|---|
| Data Bits $h5_{K1}h4_{K1}h3_{K1}h2_{K1}$ | 00 Code Symbols $c1_K, c2_K$ | 01 Code Symbols $c1_K, c2_K$ | 10 Code Symbols $c1_K, c2_K$ | 11 Code Symbols $c1_K, c2_K$ |
| 0000 | 0,0 | 1,0 | 1,1 | 0,1 |
| 0001 | 0,2 | 1,2 | 1,3 | 0,3 |
| 0010 | 0,4 | 1,4 | 1,4 | 0,5 |
| 0011 | 0,6 | 1,6 | 1,7 | 0,7 |
| 0100 | 2,0 | 3,0 | 3,1 | 2,1 |
| 0101 | 2,2 | 3,2 | 3,3 | 2,3 |
| 0110 | 2,4 | 3,4 | 3,5 | 2,5 |
| 0111 | 2,6 | 3,6 | 3,7 | 2,7 |
| 1000 | 4,0 | 5,0 | 5,5 | 4,1 |
| 1001 | 4,2 | 5,2 | 5,3 | 4,3 |
| 1010 | 4,4 | 5,4 | 5,5 | 4,5 |
| 1011 | 4,6 | 5,6 | 5,7 | 4,7 |
| 1100 | 6,0 | 7,0 | 7,1 | 6,1 |
| 1101 | 6,2 | 7,2 | 7,3 | 6,3 |
| 1110 | 6,4 | 7,4 | 7,5 | 6,5 |
| 1111 | 6,6 | 7,6 | 7,7 | 6,7 |

5.2 Density 4 Partial Response Code This code also uses a convolutional encoder 404 having a time varying, two-dimensional trellis code (illustrated in FIG. 7). However for the D=4 code, the encoder 404 takes p=6 input bits and converts this to q=2 channel symbols. One of the six input bits is used to drive convolutional coder 404. This bit selects the path followed along the trellis from a current node. The remaining five bits select a point, or value, from the signal set $C_K$ in Table 6, corresponding to the path selected by the first bit. Because five bits are used, each signal set can contain 32 signal points. With four signal sets, there are a total of 128 signal points. Each point in the symbol set is comprised of two channel symbols, thus producing an M-ary code out of encoder 404 where M=12.

This coding scheme results in a bit encoding rate of 3 bits per channel symbol. Because symbols are written 1.333 times more frequently, the net density is D=4 (i.e., 3×1.333).

One possible set of channel symbol assignments for this code are shown in Table 6. Other assignments are also possible. The full number of signal possibilities in each set comprises $6^2=36$ combinations. However, only $2^5=32$ signals are required in each set. The symbols chosen are selected from four symbol sets of 32 symbol combinations each. In each case, 2 symbols, c1, c2 are sent. These symbols are chosen from 4 signal sets of 32 Symbol combinations each. In each case, 2 symbols sent, c1 and c2, are chosen by the Signal Set number, $C_{k1}$ and the 5 Data Bits, $h6_{K1}$ $h5_{K1}$ $h4_{K1}$ $h3_{K1}$ $h2_{K1}$.

TABLE 6

| | Signal Set $C_K$ | | | |
|---|---|---|---|---|
| Data Bits $h6_{K1}, h5_{K1}, h4_{K1}, h3_{K1}, h2_{K1}$ | 00 Code Symbols $c1_{K1}, c2_K$ | 01 Code Symbols $c1_{K1}, c2_K$ | 10 Code Symbols $c1_{K1}, c2_K$ | 11 Code Symbols $c1_{K1}, c2_K$ |
| 00000 | 0,0 | 1,0 | 1,1 | 0,1 |
| 00001 | 0,2 | 1,2 | 1,3 | 0,3 |
| 00010 | 0,4 | 1,4 | 1,5 | 0,5 |
| 00011 | 0,8 | 1,6 | 1,7 | 0,7 |
| 00100 | 0,8 | 1,8 | 1,9 | 0,9 |
| 00101 | 0,10 | 1,10 | 1,11 | 0,11 |
| 00110 | 2,0 | 3,0 | 3,1 | 2,1 |
| 00111 | 2,2 | 3,2 | 3,3 | 2,3 |
| 01000 | 2,4 | 3,4 | 3,5 | 2,5 |

TABLE 6-continued

| | Signal Set $C_K$ | | | |
|---|---|---|---|---|
| Data Bits $h6_{K1}, h5_{K1}, h4_{K1}, h3_{K1}, h2_{K1}$ | 00 Code Symbols $c1_{K1}, c2_K$ | 01 Code Symbols $c1_{K1}, c2_K$ | 10 Code Symbols $c1_{K1}, c2_K$ | 11 Code Symbols $c1_{K1}, c2_K$ |
| 01001 | 2,6 | 3,6 | 3,7 | 2,7 |
| 01010 | 2,8 | 3,8 | 3,9 | 2,9 |
| 01011 | 2,10 | 3,10 | 3,11 | 2,11 |
| 01100 | 4,0 | 5,0 | 5,1 | 4,1 |
| 01101 | 4,2 | 5,2 | 5,3 | 4,3 |
| 01110 | 4,4 | 5,4 | 5,5 | 4,5 |
| 01111 | 4,6 | 5,6 | 5,7 | 4,7 |
| 10000 | 4,8 | 5,8 | 5,9 | 4,9 |
| 10001 | 4,10 | 5,10 | 5,11 | 4,11 |
| 10010 | 6,0 | 7,0 | 7,1 | 6,1 |
| 10011 | 6,2 | 7,2 | 7,3 | 6,3 |
| 10100 | 6,4 | 7,4 | 7,5 | 6,5 |
| 10101 | 6,6 | 7,6 | 7,7 | 6,7 |
| 10110 | 6,8 | 7,8 | 7,9 | 6,9 |
| 10111 | 6,10 | 7,10 | 7,11 | 6,11 |
| 11000 | 8,0 | 9,0 | 9,1 | 8,1 |
| 11001 | 8,2 | 9,2 | 9,3 | 8,3 |
| 11010 | 8,4 | 9,4 | 9,5 | 8,5 |
| 11011 | 8,6 | 9,6 | 9,7 | 8,7 |
| 1100 | 8,8 | 9,8 | 9,9 | 8,9 |
| 11101 | 8,10 | 9,10 | 9,11 | 8,11 |
| 11110 | 10,0 | 11,0 | 11,1 | 10,1 |
| 11111 | 10,2 | 11,2 | 11,3 | 10,3 |

A second possible assignment of channel symbols are shown in Table 7 below. Other Code Symbol assignments are also possible. The full number of signal possibilities in each set comprises $6^2=36$ combinations. However only $2^5=32$ signals are required in each set. In each signal set, 4 symbol pairs are reserved for the sync characters. These signal pairs are chosen for sync characters because, considered as an independent set, they have the greatest distance between singal points. The symbols are chosen from 4 Signal Sets of 32 Symbol combinations each. In each case, 2 symbols are sent, c1 and c2, are chosen by the Signal Set number, $C_k$ and the 5 Data Bits, $h6_{K1}, h5_{K1}, h4_{K1}, h3_{K1}, h2_{K1}$.

Signal Sets for special sync characters:

TABLE 7

| | Signal Set $C_K$ | | | |
|---|---|---|---|---|
| Sync Character | 00 Code Symbols $c1_{K1}c2_K$ | 01 Code Symbols $c1_{K1}c2_K$ | 10 Code Symbols $c1_{K1}c2_K$ | 11 Code Symbols $c1_{K1}c2_K$ |
| 00 | 0,0 | 1,0 | 1,1 | 0,1 |
| 01 | 0,10 | 1,10 | 1,11 | 0,11 |
| 10 | 10,0 | 11,0 | 11,1 | 10,1 |
| 11 | 10,10 | 11,10 | 11,11 | 10,11 |

Data Signal Sets with excluded sync characters:

TABLE 8

| | Signal Set $C_K$ | | | |
|---|---|---|---|---|
| Data Bits $h5_{K1}h4_{K1}h3_{K1}h2_{K1}$ | 00 Code Symbols $c1_{K1}c2_K$ | 01 Code Symbols $c1_{K1}c2_K$ | 10 Code Symbols $c1_{K1}c2_K$ | 11 Code Symbols $c1_{K1}c2_K$ |
| 00000 | 0,2 | 1,2 | 1,3 | 0,3 |
| 00001 | 0,4 | 1,4 | 1,5 | 0,5 |
| 00010 | 0,6 | 1,6 | 1,7 | 0,7 |

TABLE 8-continued

| | Signal Set $C_K$ | | | |
|---|---|---|---|---|
| Data Bits $h5_{K1}h4_{K1}h3_{K1}h2_{K1}$ | 00 Code Symbols $c1_{K1}c2_K$ | 01 Code Symbols $c1_{K1}c2_K$ | 10 Code Symbols $c1_{K1}c2_K$ | 11 Code Symbols $c1_{K1}c2_K$ |
| 00011 | 0,8 | 1,8 | 1,9 | 0,9 |
| 00100 | 2,0 | 3,0 | 3,1 | 2,1 |
| 00101 | 2,2 | 3,2 | 3,3 | 2,3 |
| 00110 | 2,4 | 3,4 | 3,5 | 2,5 |
| 00111 | 2,6 | 3,6 | 3,7 | 2,7 |
| 01000 | 2,8 | 3,8 | 3,9 | 2,9 |
| 01001 | 2,10 | 3,10 | 3,11 | 2,11 |
| 01010 | 4,0 | 5,0 | 5,1 | 4,1 |
| 01011 | 4,2 | 5,2 | 5,3 | 4,3 |
| 01100 | 4,4 | 5,4 | 5,5 | 4,5 |
| 01101 | 4,6 | 5,6 | 5,7 | 4,7 |
| 01110 | 4,8 | 5,8 | 5,9 | 4,9 |
| 01111 | 4,10 | 5,10 | 5,11 | 4,1 |
| 10000 | 6,0 | 7,0 | 7,1 | 6,1 |
| 10001 | 6,2 | 7,2 | 7,3 | 6,3 |
| 10010 | 6,4 | 7,4 | 7,5 | 6,5 |
| 10011 | 6,6 | 7,6 | 7,7 | 6,7 |
| 10100 | 6,8 | 7,8 | 7,9 | 6,9 |
| 10101 | 6,10 | 7,10 | 7,11 | 6,11 |
| 10110 | 8,0 | 9,0 | 9,1 | 8,1 |
| 10111 | 8,2 | 9,2 | 9,3 | 8,3 |
| 11000 | 8,4 | 9,4 | 9,5 | 8,5 |
| 11001 | 8,6 | 9,6 | 9,7 | 8,7 |
| 11010 | 8,8 | 9,8 | 9,9 | 8,9 |
| 11011 | 8,10 | 9,10 | 9,11 | 8,11 |
| 1100 | 10,2 | 11,2 | 11,3 | 10,3 |
| 11101 | 10,4 | 11,4 | 11,5 | 10,5 |
| 11110 | 10,6 | 11,6 | 11,7 | 10,7 |
| 11111 | 10,8 | 11,8 | 11,9 | 10,9 |

Figure 9:
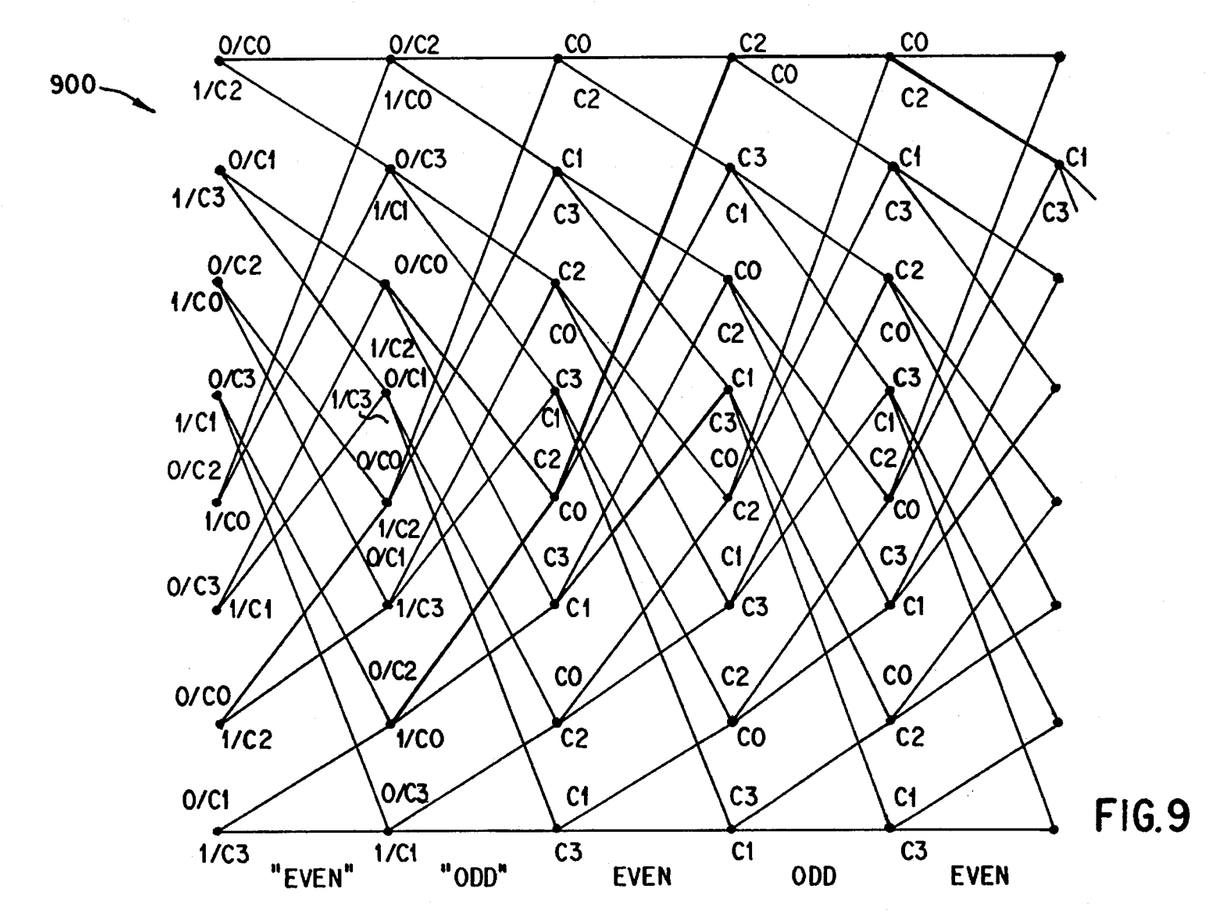
FIG. 9 depicts a time varying one dimensional 8 state trellis.

5.3 8 State Density 4 Partial Response Code This code also uses a convolutional encoder 404 having a time varying one dimentional 8 state trellis code as illustrated in FIG. 9. However for this D=4 code, the encoder 404 takes p=3 input bits and converts this to q=1 channel symbols. One of the 3 input bits is used to drive a convolutional encoder 404. This bit selects the path followed along the trellis from a current node. The remaining two bits select a point from the signal set, $C_K$ in Table 9, corresponding to the path selected by the first bit. Because 2 bits are used, each signal point set contains 4 points. With four signal sets, there are a total of 16 signal points. Each signal point is comprised of 1 channel symbol, thus producing a M-ary code out of encoder 404 where M=16.

TABLE 9

| | Signal Set $C_K$ | | | |
|---|---|---|---|---|
| | 00 | 01 | 10 | 11 |
| Data Bits $h2_{K1}h1_K$ | Code Symbols $c_K$ | Code Symbols $c_K$ | Code Symbols $c_K$ | Code Symbols $c_K$ |
| 0000 | 0 | 1 | 2 | 3 |
| 0001 | 4 | 5 | 6 | 7 |
| 0010 | 8 | 9 | 10 | 11 |
| 0011 | 12 | 13 | 14 | 15 |

6. Code Comparisons

The performance of the partial response and M-ary (d,k) codes can be evaluated by their density (in bits/unit area) and minimum distance. For an additive white gaussian noise channel, a well-known estimate of the error probability $P_e \approx N \exp^{-Sd^2_{min}}$ is where N and S are constants and $d^2_{min}$ is the minimum squared Euclidean distance between any two coded sequences.

For the M-ary (d,k) code the minimum distance is determined by adjacent points in the signal set. Assuming that the M symbols are drawn from an alphabet of points spaced uniformly on the interval [O,A], where A is the saturation level, the minimum distance is $d^2_{min}=a^2/(M-1)^2$.

For the trellis codes, the minimum distance is computed assuming the trellis codes found in (Ungerboeck, G., "Trellis-Coded Modulation Signal Sets, Part II: State of the Art," *IEEE Communications Magazine*, vol. 25, no. 2, pp. 12–21, February 1987). Trellis codes are chosen with a number of states comparable to M-ary (d,k) codes. For the D=4 code a one-dimensional, eight-state, amplitude modulation trellis code with R=3 is used. It is easy to show that this code has $d^2_{min}=10\Delta_0^2$ where $\Delta_0$ is the minimum distance between signal points. Assuming the signal points are uniformly spaced on [0, A], it is easy to show $\Delta_0=A/15$, thus $d^2_{min}=10\Delta_0^2=A^2/22.5$. For the D=3 code a two-dimensional, four-state, amplitude modulation trellis code with R=2.5 is used. This code has $d^2_{min}=A^2/12.25$. For the D=4 code a two-dimesional, four-state, amplitude modulation trellis code with R=3.0 is used. This code has a $d^2_{min}=A^2/30.25$

TABLE 10

| Code | D | $d^2$ | Gain |
|---|---|---|---|
| M = 6 (2,7) | 3 | $A^2/25$ | 0 dB |
| $PR\left(1+\frac{D}{3}\right)$ | 3⅓ | $A^2/12.25$ | 3.09 dB |
| M = 10 (3,10) | 4 | $A^2/81$ | 0 dB |
| $PR\left(1+\frac{D}{3}\right)$ | 4 | $A^2/22.5$ | 5.56 dB |
| $PR\left(1+\frac{D}{3}\right)$ | 4 | $A^2/30.25$ | 4.28 dB |

The minimum distances for the M-ary (d,k) and partial response (PR) codes are given in Table 10. The gain is defined to be the improvement in signal-to-noise ratio (SNR) over an M-ary (d,k) code with comparable density. The first comparison is between an M=6 (2,7) runlength code with density D=3.0 and $$1+\frac{D}{3}$$

partial response (PR) code with density D=3⅓. Interestingly enough, the PR code not only achieves a larger storage density, but also requires about 3 dB less SNR. Comparing the M=10 (3,10) with the 1⅔ partial response code at D=4 results in a coding gain of about 5.5 dB.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed:

1. An encoder for converting data to a multi-level format for recording in a multi-amplitude optical recording channel, the multi-amplitude optical recording channel having a write laser at a first wavelength to write data to an optical media and a read laser at a second wavelength to read data from said optical media, wherein a write spot size of said write laser is smaller than a read spot size of said read laser, thereby inducing intersymbol interference on the optical recording channel, the encoder comprising:

encoder means for converting binary input data to M-ary data at M levels, where M≧3; and precoder means for coding said M-ary data before the data are written to the optical recording channel to anticipate the effects of the intersymbol interference caused by the spot size differential between the read and write laser.

2. The encoder of claim 1, wherein said encoder means is a trellis-modulation coder.

3. The encoder of claim 1, wherein the read spot size of the recording channel is 1⅓ times the size of the write spot and said precoder means comprises means for precoding said M-ary data to subtract ⅓ of the level of a first mark from the level of a current mark to be written.

4. The encoder of claim 3, wherein said precoder means further comprises means for precoding said M-ary data such that $$a_k = \left(c_k - \frac{1}{3}a_{k-j}\right) \bmod M$$

wherein $a_k$ is a precoder means output and $c_k$ is said M-ary data.

5. The encoder of claim 3, wherein said first mark precedes said current mark.

6. The encoder of claim 3, wherein said encoder means comprises trellis coder means for converting six input bits into two M-ary symbols, said trellis coder means comprising:

means for using one of said six input bits to select a signal set within the trellis coder means; and means for using the remaining bits of said six input bits to select one of a plurality of values from said selected signal set.

7. The encoder of claim 3, wherein said encoder means comprises trellis coder means for converting five input bits into two M-ary symbols, said trellis coder means comprising:

means for using one of said six input bits to select a signal set within the trellis coder means; and means for using the remaining bits of said five input bits to select one of a plurality of values from said selected signal set.

8. The encoder of claim 3, wherein said encoder means comprises trellis coder means for converting three input bits into M-ary symbols, said trellis coder means comprising:

means for using one of said three input bits to select a signal set within the trellis coder means; and means for using the remaining bits of said three input bits to select one of a plurality of values from said selected signal set.

9. The encoder of claim 1, wherein said precoder means comprises means for precoding said M-ary data such that $$a_k = \left(c_k - \frac{1}{3}a_{k-j}\right) \bmod M$$

wherein $a_k$ is a precoder means output and $c_k$ is said M-ary data.

10. An optical recording system for recording multi-level data, comprising:

an optical recording channel comprising a write laser at a first wavelength to write data to an optical media and a read laser at a second wavelength to read data from said optical media, wherein a write spot size of said write laser is smaller than a read spot size of said read laser, thereby inducing intersymbol interference on said channel;

an encoder for converting binary input data to multi-level data for recording on said optical media, wherein said encoder comprises encoder means for converting said binary input data into M-ary data, where $M \geq 3$; and precoder means for coding said M-ary data before the data are written to the optical recording channel to anticipate the effects of the intersymbol interference caused by the spot size differential between the read and write laser.

11. The recording system of claim 10, wherein said encoder means is a trellis-modulation coder.

12. The recording system of claim 10, wherein the read spot size of the recording channel is 1⅓ times the size of the write spot and said precoder means comprises means for precoding said M-ary data to subtract ⅓ of the level of a first mark from the level of a current mark to be written.

13. The recording system of claim 12, wherein said precoder means further comprises means for precoding said M-ary data such that $$a_k = \left( c_k - \frac{1}{3} a_{k-j} \right) \bmod M$$

wherein $a_k$ is a precoder means output and $C_k$ is said M-ary data.

14. The recording system of claim 12, wherein said first mark precedes said current mark.

15. The recording system of claim 12, wherein said encoder means comprises trellis coder means for converting six input bits into two M-ary symbols, said trellis coder means comprising:

means for using one of said six input bits to select a signal set within the trellis coder means; and means for using the remaining bits of said six input bits to select one of a plurality of values from said selected signal set.

16. The recording system of claim 12, wherein said encoder means comprises trellis coder means for converting five input bits into two M-ary symbols, said trellis coder means comprising:

means for using one of said six input bits to select a signal set within the trellis coder means; and means for using the remaining bits of said five input bits to select one of a plurality of values from said selected signal set.

17. The recording system of claim 12, wherein said encoder means comprises trellis coder means for converting three input bits into M-ary symbols, said trellis coder means comprising:

means for using one of said three input bits to select a signal set within the trellis coder means; and means for using the remaining bits of said three input bits to select one of a plurality of values from said selected signal set.

18. The recording system of claim 10, wherein said precoder means comprises means for precoding said Moary data such that $$a_k = \left( c_k - \frac{1}{3} a_{k-j} \right) \bmod M$$

wherein $a_k$ is a precoder means output and $c_k$ is said M-ary data.

* * * * *